Figure 1:
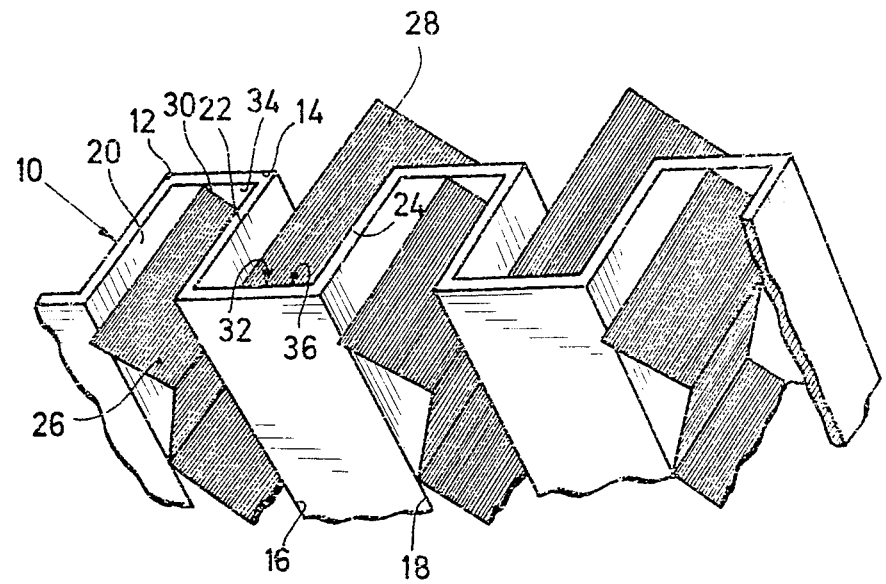

United States Patent [19]

Esch

[11] Patent Number: 4,874,517

[45] Date of Patent: Oct. 17, 1989

[54] FILTER ARRANGEMENT WITH PLEAT DISTANCE PIECE

[75] Inventor: Hans W. Esch, Altenhasslau, Fed. Rep. of Germany

[73] Assignee: AVK Filtertechnik GmbH, Hasselroth, Fed. Rep. of Germany

[21] Appl. No.: 75,466

[22] Filed: Jul. 20, 1987

[51] Int. Cl.[4] ............................................. B01D 27/06
[52] U.S. Cl. .............................. 210/493.5; 210/494.2; 210/494.3; 210/498; 55/500
[58] Field of Search ............... 210/493.1, 493.2, 493.4, 210/493.5, 494.2, 494.1, 494.3, 498; 55/497, 498, 500, 521

[56] References Cited

U.S. PATENT DOCUMENTS

| | | | |
|---|---|---|---|
| 2,907,407 | 10/1959 | Engle et al. | 55/500 |
| 3,242,656 | 3/1966 | Murphy, Jr. | 55/500 |
| 3,385,038 | 5/1968 | Davis | 210/493.1 |
| 3,950,256 | 4/1976 | Read | 210/493.5 |
| 4,154,688 | 5/1979 | Pall | 55/498 |
| 4,488,966 | 12/1984 | Schaeffer | 55/500 |
| 4,537,812 | 8/1985 | Elhers | 55/500 |
| 4,680,118 | 7/1987 | Taza | 210/493.1 |
| 4,708,724 | 11/1987 | Agnew | 55/500 |

FOREIGN PATENT DOCUMENTS

| | | |
|---|---|---|
| 1607697 | 7/1969 | Fed. Rep. of Germany . |
| 1507756 | 12/1969 | Fed. Rep. of Germany . |
| 78747 | 1/1971 | Fed. Rep. of Germany ... 210/493.1 |
| 197710 | 10/1977 | U.S.S.R. ........................ 210/493.1 |

Primary Examiner—Richard V. Fisher
Assistant Examiner—Wanda L. Millard
Attorney, Agent, or Firm—Beveridge, DeGrandi & Weilacher

[57] ABSTRACT

A filter arrangement is suggested where the filter means (38) is placed between distance pieces (48, 50, 52). In order that the longitudinal edges (64, 66, 68) of the preferably zigzag-folded distance pieces cannot cause any damage to the filter means, they are provided with a substantially edgeless cap (90, 92, 94), of which the maximum width equals that of the distance pieces.

7 Claims, 3 Drawing Sheets

FILTER ARRANGEMENT WITH PLEAT DISTANCE PIECE

The invention refers to a filter arrangement, comprising a folded filter means, such as filter paper for suspended matter, with distance pieces being arranged between adjacent sections of the filter means, where each distance piece is folded zigzagwise preferably in longitudinal section, and an essentially non-angular head-piece being arranged along one longitudinal axis of said distance pieces for supporting the filter means. Filter systems are known in which dust-laden air or gases are filtered by means of special cleanable filters for suspended matters. The filter system concerns preferably suspended matter filters of the class S, which obtain a high cleaning degree. The filters used for this purpose comprise filter paper for suspended matter, which normally is folded and placed in a wooden or metal frame (box) and then cast together with the frame. The distance pieces are arranged between the folds. The filtering surface of a filter paper placed into a frame of e.g. $610 \times 610 \times 292$ mm$^3$ is between 10 to 25 m$^2$.

In order to place the filter paper properly into the boxes, a constructional processing must be made. Therefore at first the paper width wound on rolls is punched in such a manner that crease edges are impressed resting against the distance pieces. The distance pieces are normally made of aluminum sheets and usually have a thickness of 0,04 mm. The distance pieces are zigzag-folded in section, thus presenting lined up roof-shaped sections. The adjacent sections of the filter means are resting against the broadsides of the distance pieces, thus against the buckling lines of the distance pieces extending parallel to each other. Since these edges are blunt, a damage to the filter means is almost impossible.

Of course, the risk of damage can arise in the folding lines of the filter material when folding it. However, an even greater risk exists in the abutment of the longitudinal edges in the front areas of the folds. In order to avoid any damage to the filter surfaces, it has already been suggested to flange the longitudinal edge of the distance piece which is interacting with the filter means (DE-A-No. 16 07 697). However, if the assembling or placing of the folded filter means with the distance pieces into the frame is not done in accordance with the rules of good workmanship, then there is still the risk of damage to the filter and thus a partial inefficacy of it as the flanged edges usually have a thickness of 0,08 mm. Accordingly the edges will be sharp as before.

DE-B-No. 15 07 756 describes a filter arrangement with zigzag-folded distance pieces, of which the longitudinal edges are covered with protecting caps extending along the lateral faces having the folding lines. This results in essential disadvantages. On the one hand, the transition between the protecting cap and the lateral faces is not continuous, resulting in the risk of damage to the filter means. On the other hand, it is even more disadvantageous that by the steps being formed between the lateral faces and the cap, the filter means is hindered from resting against the lateral faces in its total depth. Due to the distance between lateral face and filter means, said means can flutter when air is flowing through. This fluttering or vibrating, however, leads to an untimely destruction of the filter means.

It is the object of the present invention to construct a filter arrangement of the kind as described herein in such a manner as to completely exclude the risk of damage to the filter means, and still having the filter means rest against the distance pieces. Also a folding of the filter means shall no longer be necessary without making hereby the arranging of the filter means in the metal frames and the placing of the distance pieces more difficult.

According to the invention the problem is solved in such way that the cap is without any edges, at least in the area interacting with the filter means, and has a maximum width which corresponds to the width of the folded distance piece. The cap in section preferably is circular or semi-circular. To this effect the cap preferably can be a round cord, a tube element, or the like.

Of course, the cap can likewise be designed as a polygon as long as no sharp edges are formed thereby which could lead to a damage to the filter means. Such a construction of the cap is also understood as being edgeless within the meaning of the invention.

The invention further distinguishes itself by the fact that the cap is detachably arranged on the longitudinal edge without enclosing the same.

Consequently, according to the invention it is suggested to provide the respective longitudinal edge of the distance piece with a cap along which the filter means is led. Because the effective range of the cap has no sharp edges, the risk of danger to the filter means is eliminated.

As the edgeless cap is not wider than the distance piece, the filter means is firmly fixed over the total depth of the distance piece and thus cannot move. With the circular or semi-circular designed cap there are approximate laminar inflow conditions, resulting in flow losses of about 20% as compared to those filters provided with U-shaped caps according to prior art, at the same volume. Also the abrasion by the gas to be sucked off in the range of the cap is considerably less.

By the cap itself it is likewise no longer necessary to first fold the filter means cornerwise, a compelling step of process by the prior art with flanged edges, in order to adapt it to the width of the distance piece.

Another advantage is the cap covering the longitudinal edge during the cleaning-off of the filter means. According to prior art, there is an undesired load on the front surfaces of the folds being exposed to the compressed air jet used for the cleaning-off, caused by the arising pressing pressure entailing the risk of damage; but by the rounding as suggested in the present invention, an automatic lateral conduct of the compressed air jet into the folds, thus into the range of the distance pieces, takes place. In this manner the risk of damage ot the filter means is considerably reduced.

According to still another embodiment of the invention, the contour of that range of the cap interacting with the filter means is arc-shaped in section.

On principle, a cap composed of a band would likewise accomplish the object according to the invention, so far as the edges interacting with the filter means are rounded off and the width is corresponding to that of the distance piece.

Without neglecting the invention, the distance piece with the cap can be constructed as one piece and e.g. cast from synthetic material or extruded. Also the distance piece must not necessarily be zigzag-folded. Rather the distance piece can also be a hollow body with rounded edges, corresponding approximately to the sheathing ends of customary distance pieces.

In still another embodiment of the invention the cap is made of an elastomer, as e.g. silicon-caoutchouc, where preferably the longitudinal edge is extending within the cap. In this manner inaccurate fitting during the placing of the cap on the longitudinal edge of the distance piece is inconsiderable, as sharp edges appearing exclusively in the range of the longitudinal edge, by no means can interact with the filter means.

If the cap is designed as a round cord or tube, then said cord or tube must merely be placed on the longitudinal edge, or more exactly, on that side in the plane of which the folded front edges of the distance piece are extending, around which the filter means is placed.

Of course, the cap can also be made of e.g. ceramics, glass, or metal.

It is further suggested by the invention that a channelled mold, after having been sprayed with a separating agent, is filled up with an elastomer in order to subsequently insert the longitudinal edge to be equipped with the cap according to the invention. As soon as the elastomer has hardened somewhat, i.e. can be removed from the mold, the distance holder together with the cap is taken out of the mold. As soon as the elastomer has hardened to the desired extent, it can be used for a filter arrangement according to the invention.

Further details, advantages, and characteristics of the invention will follow not only from the claims, the features to be taken therefrom, in itself and/or in combination, but also from the following description of a preferred embodiment as illustrated in the drawing.

Figure 2:
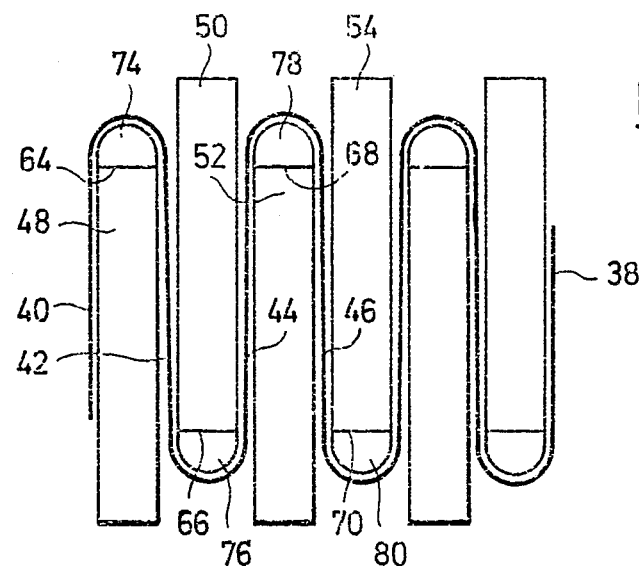
Figure 4:
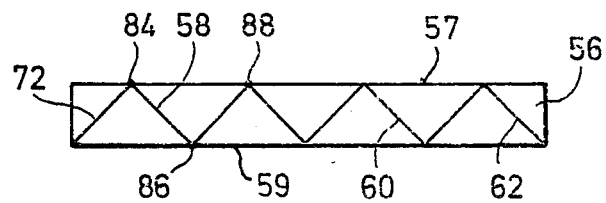
Figure 3:
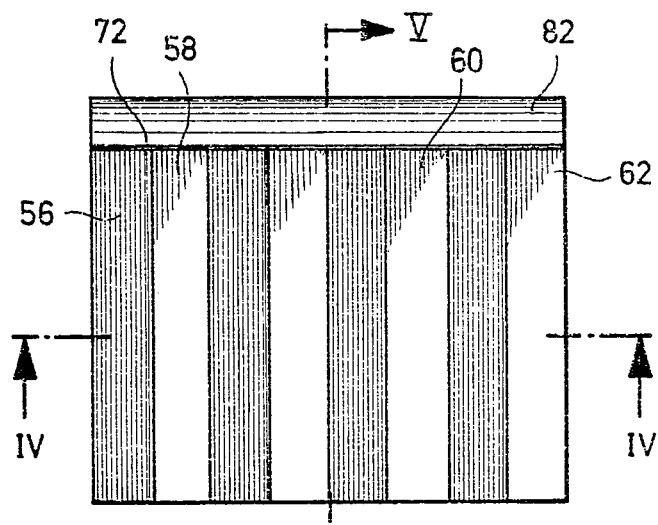
Figure 5:
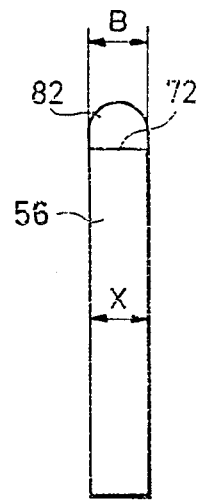
Figure 6:
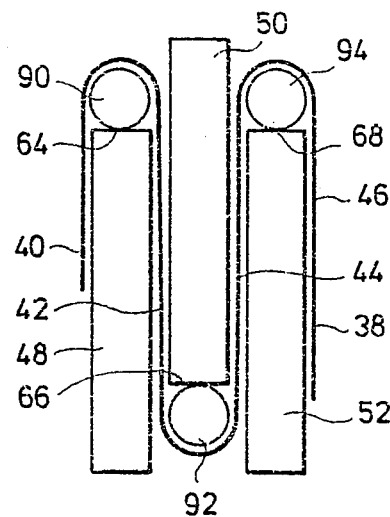
Figure 8:
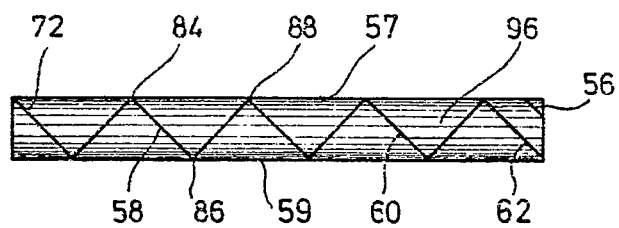
Figure 7:
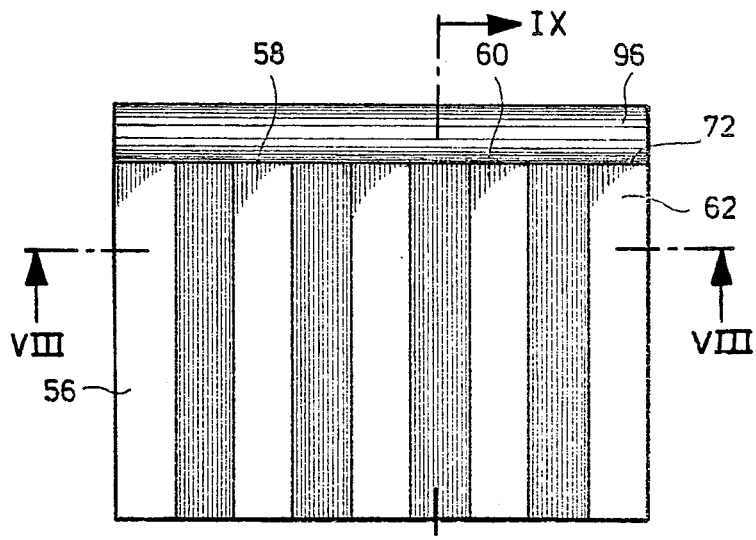
Figure 9:

FIG. 1 shows a detail of a filter arrangement according to prior art,

FIG. 2 shows a detail of a first embodiment of a filter arrangement designed according to the invention, FIG. 3 is a side view of a distance piece of the filter arrangement according to FIG. 2, FIG. 4 is a sectional view along the line IV—IV in FIG. 3, FIG. 5 is a sectional view along the line V—V in FIG. 3, FIG. 6 shows a detail of a second embodiment of a filter arrangement according to the invention, FIG. 7 is a side view of a distance piece of the filter arrangement according to FIG. 6, FIG. 8 is a sectional view along the line VIII—VIII of FIG. 7, and FIG. 9 is a sectional view along the line IX—IX of FIG. 8.

FIG. 1 illustrates a detail of a preferably cleanable filter arrangement. A folded filter paper (10), preferably filter paper for suspended matter, is used as filter means. Thereby the filter paper (10) is folded by means of a folding machine, where the distance of the edges (12), (14), resp. (16), and (18) in the range of the front surfaces of the filter means (10) is adapted to the depth of the distance holders (26) and (28), placed between adjacent sections (20), (22), resp. (22), (24) of the filter means (10). The distance pieces (26), (28) are zig-zag-bent aluminum sheets, of which a longitudinal edge, in the embodiment example the longitudinal edges (30), and (32), is interacting with the inner faces (34) and (36) of the filter means (10). Although the longitudinal edges (30), (32) of the distance pieces (26), (28) are normally curled for not being too sharp-edged, there is, however, still the risk of damage to the filter means (10), as the thickness of the used sheet is usually within the range of 0,04 mm so that the curled edges (30) and (32) have a thickness of 0,08 mm only.

The risk of damage to the filter means (10), however, is not only due to the longitudinal edges (30) and (32), but also by the folds (12), (14), (16), (18) themselves.

The FIGS. 2 to 5 illustrate details of a first embodiment of a filter arrangement designed according to the invention. With a suitable filter arrangement, the used filter means (38) likewise in folds is placed in a frame made e.g. of wood or metal (not shown). Between the adjacent sections (40), (42), resp. (42), (44), resp. (44), (46) of the filter means (38), folded distance pieces (48), (50), (52), (54) are arranged, preferably made of aluminum sheet or also of impregnated paper of synthetic material, said distance pieces forming a zigzag in longitudinal section, as illustrated by a sectional view along the ine IV—IV of a distance piece (56) according to FIG. 3 or, resp. FIG. 4. In other words, the geometry of the distance pieces (48), (50), (52), (54) resp. (56)is defined by surfaces inclined against each other like a roof, of which three as an example are marked by the reference numbers (58), (60), (62). The longitudinal edges (64), (66), (68), (70), (72), more strictly speaking the planes in which the zigzag-shaped edges of the distance pieces (48), (50), (52), (54), (56) are extending, in the range of which the filter means (38) is placed around, are provided with caps (74), (76), (78), (80), (82), being arc-shaped in section and completely cover the mentioned longitudinal edges, of which the vertexes (indicated by reference numbers (84), (86), and (88), in the known arrangements can lead to damages to the filter means. Here the width B of the caps (74), (76), (78), (80), (82) is equal to the width x of the distance pieces (48), (50), (52), (54), (56), thus according to FIG. 4, the distance of the lines (57) and (59) in which the vertexes (84), (88), resp. (86) are located. Consequently the filter means (38) does not directly get in tough anymore with the vertexes (84), (86), (88) of the edges (64), (66), (68), (70), (72), but rather with the caps (74), (76), (78), (80), (82) preferably being arc-shaped in section. In this manner the risk of danger to the filter means is excluded. In addition, it is no longer necessary to pre-fold the filter means, in order to adapt the distance of the folding edges as described in FIG. 1 in the range of the front surfaces of the folds to the depth of the zigzag-shaped longitudinal edge extending in one plane. Since furthermore the width b of the caps (74), (76), (78), (80), (82) is equal to that of the distance pieces (48), (50), (52), (54), (56), the sections of the filter means (38) - (40), (42), (44), (46) lie firmly supported between the distance pieces (48), (50) resp. (50), (52) resp. (52), (54), so that a fluttering or, resp. vibrating is impossible.

The caps (74), (76), (78), (80), (82) can be made of an elastomer, like e.g. silicon-rubber. Hereby the longitudinal edges can be provided with the caps in a simple manner as far as the method of production is concerned. It is only necessary e.g. to fill up a groove-like mold with a liquid elastomer in order to subsequently insert the edge provided with the cap. As soon as the elastomer is hardened just so much that it can be removed from the mold, the distance piece together with the cap having already the desired shape is removed from the mold, in order to be used, after a further hardening, in a filter arrangement as a finish-formed distance piece according to the invention. In order to facilitate its removal from the mold, said mold will be coated or sprayed with a separating agent before the liquid elastomer is filled into the mold.

The FIGS. 6 to 9 show an independent embodiment of a filter arrangement designed according to the invention to which special attention must be called, in which those parts already having been described in connection with the FIGS. 2 to 5, will have the same reference numbers.

Unlike the embodiment according to the FIGS. 2 to 5, it is now suggested to provide the distance pieces (48), (50), (52), resp. (56) with a cap (90), (92), (94) resp. (96) of circular section. Here the cap (90), (92), (94) resp. (96) is detachably arranged on the longitudinal edges (64), (66), (68) resp. (72). In other words, the cap (90), (92), (94), (96), which e.g. can be a round cord of any material whatsoever, or also a tubular element or even a hose, is merely put on the zigzagwise extending longitudinal edges (64), (66), (68) resp. (72), and covers these against the filter means (38) in order to protect it from damages.

As especially illustrated by FIG. 8 in a purely diagrammatic and reduced outline, the circular cap (96) is covering the vertexes (84), (86), and (88) so that the filter means (38) is safely protected from damages without preventing the filter means (38) over the depth of the distance piece (56) from being fully supported by said distance piece.

Without leaving the invention, the cap in section can likewise be designed as a polygon, like e.g. an octagon, as far as the ranges interacting with the filter means are not sharp-edged and thus cannot cause any damage.

What is claimed is:

1. A filter arrangement comprising:

a pleated filter means including a plurality of adjacent sections extending parallel to each other; and a distance piece consisting essentially of a sheet of material having essentially continuous zigzag folds in a longitudinal direction and defining essentially longitudinal zigzag edges, said distance piece extending between and uniformly supporting each of said adjacent sections, and a cap extending along the plane defined by one of said zigzag longitudinal edges, said cap having a maximum width corresponding to the width of said zigzag folds and being detachably arranged on said one of said zigzag longitudinal edges, said cap supporting said filter means and being essentially free of edges in the range supporting said filter means.

2. A filter arrangement according to claim 1 wherein said cap is circular or semicircular in section.

3. A filter arrangement according to claim 1 wherein said cap comprises a round cord or a tube element.

4. A filter arrangement according to claim 1 wherein the region of said cap supporting said filter means is arc-shaped in section.

5. A filter arrangement according to claim 1 wherein said cap comprises a segment of a regular cylinder or a flat profile with rounded edges extending flush to the plane defined by one of said longitudinal edges of said distance piece.

6. A filter arrangement according to claim 1 wherein said cap is made of elastomer ceramics, galss, or metal.

7. A filter arrangement according to claim 1 wherein said cap is flush with one of said zigzag longitudinal edges of said distance piece.

* * * * *